April 6, 1937.  C. E. REED  2,076,000
ROLLER CUTTER AND ANTIFRICTION BEARING ASSEMBLY FOR EARTH BORING DRILLS
Original Filed Aug. 6, 1935

Inventor:
Clarence E. Reed,
By Spear, Donaldson & Hall
Attorneys.

Patented Apr. 6, 1937

2,076,000

UNITED STATES PATENT OFFICE

2,076,000

ROLLER CUTTER AND ANTIFRICTION BEARING ASSEMBLY FOR EARTH BORING DRILLS

Clarence E. Reed, Wichita, Kans., assignor to Chicago Pneumatic Tool Company, New York, N. Y., a corporation of New Jersey Application August 6, 1935, Serial No. 34,991
Renewed December 15, 1936

2 Claims. (Cl. 255—71)

The invention concerns a form of roller cutter, spindle, and anti-friction bearing assembly for earth boring drills intended to provide a simple and efficient construction, and one adapted for boring wells of comparatively small diameter, although the invention is not limited in this respect.

In the accompanying drawing—

Figure 1:
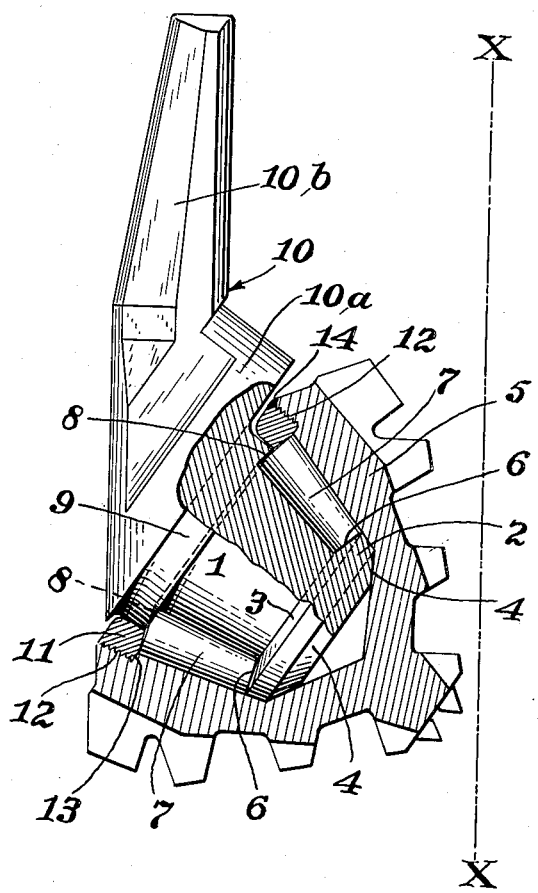
Figure 1 is a side view of the spindle, anti-friction bearings, and the spindle support with the roller cutter shown in section assembled therewith.
Figure 2:
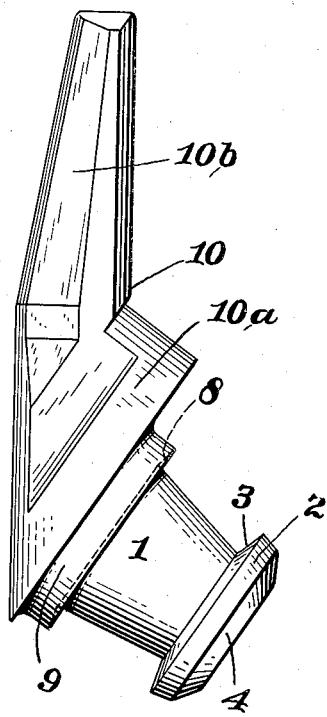
Fig. 2 is a side view of the spindle and its support with the anti-friction bearings and cutter omitted.

In this drawing, 1 indicates the body portion of the spindle which is of frusto-conical form. Integrally formed with the smaller diameter end of this body is a flange 2 which provides the terminal free end of the spindle. This flange has a beveled face 3 adjacent the frusto-conical body portion, and its terminal face 4 is beveled and provides a friction bearing surface to take the end thrust of the rotary toothed cutter 5. The beveled face 3 of the terminal flange 2 is adapted to receive contact from the end faces 6 at the smaller ends of the frusto-conical rollers 7. These rollers find a bearing surface on the frusto-conical body portion 1. The base faces of these frusto-conical rollers at the larger ends thereof find a bearing against the face of the undercut side face 8 of an enlarged annular portion or shoulder of the spindle structure, indicated at 9. The peripheral surface of this enlarged portion 9 is cylindrical. This portion is of larger diameter than the larger diameter end at the base of the frusto-conical body portion 1. Its undercut face 8 overlies the end face at the large end of the frusto-conical roller for about one-half of its diameter. The said annular portion 9 is connected with the support 10 which extends at an angle to the axis of the spindle and is adapted to be secured in any desirable manner to the bit head. This support is made up of a main body portion 10a and the shank portion 10b. The portion 9 is integral with the body portion 10a, and this is true also of all parts of the spindle and the connected support. In other words, the support 10 with the shank 10b, the body portion 10a, the annular shoulder portion 9, the body portion 1 of the spindle, and its terminal flange 2 at the free end of the spindle, are all formed in one piece.

In order to retain the roller cutter in place in connection with the assembly, the frusto-conical rollers are utilized in part as locking means, which, while sustaining the roller cutter in place, will allow it to have free rotary movement. Co-operating with the frusto-conical rollers for this rotative locking effect upon the rotary cutter, there is employed a ring 11 having a screw threaded connection at 12 with the roller cutter within the base portion thereof. This ring finds a seat at 13 on a shoulder of the cutter. The ring bears upon the larger end faces of the frusto-conical roller bearings for about one-half the diameter of said faces, and the inner circumference or bore of the ring surrounds the peripheral surface of the annular portion 9 of the spindle construction.

End thrust outwardly from the vertical axis of the bit head, which is indicated diagrammatically by the line X—X, is taken by the beveled terminal face 4 at the free end of the spindle, and, in part, this end thrust is also taken by the conical rollers, and the shoulder 8, formed by the undercut wall of the portion 9. Any tendency of the roller to slip off from the spindle and anti-friction roller assembly in a direction towards the vertical axis of the drill will be resisted by the ring 11 bearing upon the larger end faces of the frusto-conical rollers.

In assembling the parts of the appliance, the ring 11, which is formed in one piece, is passed over the flange 2 of the spindle and also over the annular portion 9 so as to surround the peripheral face of said portion. It may be noted that the annular portion 9 is of larger diameter than the flange 2, and the inner bore of the ring 11 is of a diameter which will enable it, as just stated, to be slipped into place surrounding said portion 9. This ring is exposed beyond the lower end of the body portion 10a of the support so that it may be held against rotation while the roller cutter is turned into place in connection with this ring. Previous to turning the roller cutter into place, however, the frusto-conical anti-friction rollers 7 have been placed in position with their ends bearing respectively against the beveled face 3 of the flange 2 and the face of the undercut 8 of the annular portion 9 and the ring having been placed in position, the assembly is completed by holding this ring against turning while the cutter is turned into connection with the screw threaded part of said ring.

The ring may be secured to the cutter in any suitable manner, as by welding at 14. The ring 11 may be held against turning while the cutter is attached thereto by any suitable form of wrench engaging recesses formed in the ring, or it may be otherwise held.

I claim:

1. A roller cutter, spindle and anti-friction bearing assembly for earth boring drills, comprising a spindle having a frusto-conical bearing portion with an annular flange at its smaller diameter free end, and with an annular shoulder at its larger diameter end, frusto-conical roller bearings on said body portion having their smaller end faces engaging said annular flange, and their larger diameter end faces in part engaging the annular shoulder on the spindle, a frusto-conical roller cutter mounted on the frusto-conical roller bearings and having a ring shaped member held within its base and bearing on a part of the larger diameter end faces of the frusto-conical bearing rollers, said rollers taking end thrusts of the frusto-conical roller cutters both outwardly and inwardly in respect to the vertical axis of the drill, the outward end thrust being imposed upon the peripheries of said rollers, and sustained by said shoulder and the inward thrust being imposed upon the larger diameter end faces of said rollers, and transmitted through said rollers to the annular flange.

2. A roller cutter spindle and anti-friction bearing assembly for earth boring drills according to claim 1 in which the wall of the bore of the apex portion of the roller cutter has frictional engagement with the end face of the flange at the end of the spindle.

CLARENCE E. REED.